United States Patent
Dumitras et al.

(10) Patent No.: US 7,194,035 B2
(45) Date of Patent: Mar. 20, 2007

(54) METHOD AND APPARATUS FOR IMPROVED CODING MODE SELECTION

(75) Inventors: Adriana Dumitras, Sunnyvale, CA (US); Barin Geoffry Haskell, Mountain View, CA (US); Atul Puri, Cupertino, CA (US)

(73) Assignee: Apple Computer, Inc., Cupertino, CA (US)

( * ) Notice: Subject to any disclaimer, the term of this patent is extended or adjusted under 35 U.S.C. 154(b) by 236 days.

(21) Appl. No.: 10/614,929

(22) Filed: Jul. 7, 2003

(65) Prior Publication Data

US 2004/0131121 A1 Jul. 8, 2004

Related U.S. Application Data

(60) Provisional application No. 60/439,062, filed on Jan. 8, 2003.

(51) Int. Cl.
*H04N 7/12* (2006.01)

(52) U.S. Cl. .................................. 375/240.26

(58) Field of Classification Search ........... 375/240.01, 375/240.02, 240.03, 240.12, 240.16, 240.18, 375/240.26, 240.27; H04N 7/12
See application file for complete search history.

(56) References Cited

U.S. PATENT DOCUMENTS

| | | | |
|---|---|---|---|
| 5,691,770 | A | 11/1997 | Keesman et al. |
| 5,790,131 | A | 8/1998 | Liang et al. |
| 5,867,221 | A | 2/1999 | Pullen et al. |
| 5,872,598 | A | 2/1999 | Legall et al. |
| 5,923,376 | A | 7/1999 | Pullen et al. |
| 6,111,991 | A | 8/2000 | Ribas-Corbera et al. |
| 6,414,992 | B1 | 7/2002 | Sriram et al. |
| 6,493,385 | B1 | 12/2002 | Sekiguchi et al. |
| 2004/0184546 | A1 | 9/2004 | Haskell |

FOREIGN PATENT DOCUMENTS

AU  2597697 A  10/1997

(Continued)

OTHER PUBLICATIONS

International Search Report, Jul. 5, 2004.

(Continued)

*Primary Examiner*—Young Lee
(74) *Attorney, Agent, or Firm*—Stattler Johansen & Adeli, LLP

(57) ABSTRACT

Some embodiments provide a method of performing mode selection in a video compression and encoding system. The method encodes with several encoding modes from a set of encoding modes. The method computes a distortion value for each encoding mode from the several encoding modes. The method computes a bit rate value for each encoding mode from the several encoding modes. The method computes a Lagrangian value for each encoding mode from the several encoding modes, using the distortion value, the bit rate value, and a Lagrangian multiplier. The method selects an encoding mode based on the Lagrangian values.

In some embodiments, computing the distortion value includes using a function that reduces the effects of outliers. In some embodiments, the Lagrangian multiplier is a slow varying Lagrangian multiplier that varies at a slower rate than a varying reference Lagrangian multiplier for a reference encoding mode. In yet some embodiments, the method clusters the Lagrangian values.

7 Claims, 4 Drawing Sheets

FOREIGN PATENT DOCUMENTS

| AU | 3208897 A | 12/1997 |
|---|---|---|
| EP | 0890265 A1 | 1/1999 |
| EP | 1170954 | 1/2002 |
| WO | WO 9737495 A1 | 10/1997 |
| WO | WO 9743860 A1 | 11/1997 |

OTHER PUBLICATIONS

Dumitras A. et al., Enhancement of direct mode selection in B pictures for bit rate reduction of compressed video sequences, Image Processing, 2003. Proceedings. 2003 International Conference on, vol. 3, Sep. 14, 2003, pp. 825-828.

Mei-Yin Shen et al., Fast compression artifact reduction technique based on nonlinear filtering, Circuits and Systems, 1999. ISCAS '99. Proceedinggs of the 1999 IEEE International Symposium on Orlando, FL, USA 30 May 30-Jun. 2, 1999, Piscataway, NJ, USA, IEEE, US, May 30, 1999, pp. 179-182.

Mei-Yin Shen et al., Real-time compression artifact reduction via robust nonlinear filtering, Image Processing, 1999. ICIP 99. Proceedings. 1999 International Conference on KOBE, Japan Oct. 24-28, 1999, Piscataway, NJ, USA, IEEE, US, Oct. 24, 1999, pp. 565-569.

Schwarz H et al., An Improved H.26L Coder Using Lagrangian Coder Control, ITU Telecommunications Standardization Sector Study Group 16, XX, XX, Oct. 18, 2001, pp. 1-8.

Segall C A et al., Institute of Electrical and Electronics Engineers: "Pre-And Post-Processing Algorithms for Compressed Video Enhancement" Conference Record of the 34th. Asilomar Conference on Signals, Systems, & Computers. Pacific Grove, CA, Oct. 29-Nov. 1, 2000, Asilomar Conference on Signals, Systems and Computers, New York, NY: IEEE, US, vol. vol. 2 of 2. Conf. 34, Oct. 29, 2000, pp. 1369-1373.

Seungjoon Yang et al., Blocking effect removal using regularization and dithering, Image Processing, 1998. ICIP 98. Proceedings. 1998 International Conference on Chicago, IL, USA Oct. 4-7, 1998, Los Alamitos, CA, USA, IEEE Comput. Soc, US, Oct. 4, 1998, pp. 415-419.

Wiegand T. et al., Lagrange multiplier selection in hybrid video coder control, Proceedings 2001 International Conference on Image Processing. ICIP 2001. Thessaloniki, Greece, Oct. 7-10, 2001, International Conference on Image Processing, New York, NY: IEEE, US, vol. vol. 1 of 3. Conf. 8, Oct. 7, 2001, pp. 542-545.

International Search Report, including its written opinion. Oct. 1, 2004.

Kossentini F et al.., "Predictive RD optimized motion estimation for very low bit-rate Coding" IEEE Journal on selected areas in Communications, IEEE Inc. New York, U.S., vol. 15, No. 9, Dec. 1, 1997, pp. 1752-1763, XP000726013. ISSN: 0733-8716 Paragraph '0111?; figure 4.

Zhu Q-F et al.., "Image reconstruction for hybrid video coding systems" Data compression conference, 1992. DCC '92. Snowbird, UT, USA Mar. 24-27, 1992, Los Alamitos, CA, USA, IEEE Comput. Soc, US, Mar. 24, 1992, pp. ISBN: 0-8186-2717-4 p. 234, line 7 -line 10.

International Search Report, Mar. 12, 2004, Apple Computer, Inc.

Jinho Choi, et al., "A Stable Feedback Control of the Buffer State Using the Controlled Lagrange Multiplier Method," IEEE Transactions on Image Processing, Sep. 1, 1994, pp. 546-558, vol. 3 No. 5, IEEE Inc. New York, US.

Lee W. Y., et al., "Fast Algorithm for Optimal Bit Allocation in a Rate-Distortion Sense" *Electronics Letters*, Sep. 26, 1996, pp. 1871-1873, vol. 32 No. 20, Stevenage, Herts, GB.

Yang Y., et al. "Rate-Distortion Optimizations for Region and Object Based Wavelet Video Coding" *Conference Record of the 34th . Asilomar Conference on Signals, Systems, & Computers*, Oct. 29, 2000, pp. 1363-1368, vol. 2 of 2. conf. 34, IEEE, New York, NY, US.

Antonio Ortega and Kannan Ramchandran, "Rate-Distortion Methods for Image and Video Compression," IEEE Signal Processing Magazine, pp. 23-50, Nov. 1998.

Gary J. Sullivan and Thomas Wiegand, "Rate-Distortion Optimization for Video Compression," IEEE Signal Processing Magazine, vol. 15 No. 6, pp. 74-90, Nov. 1998.

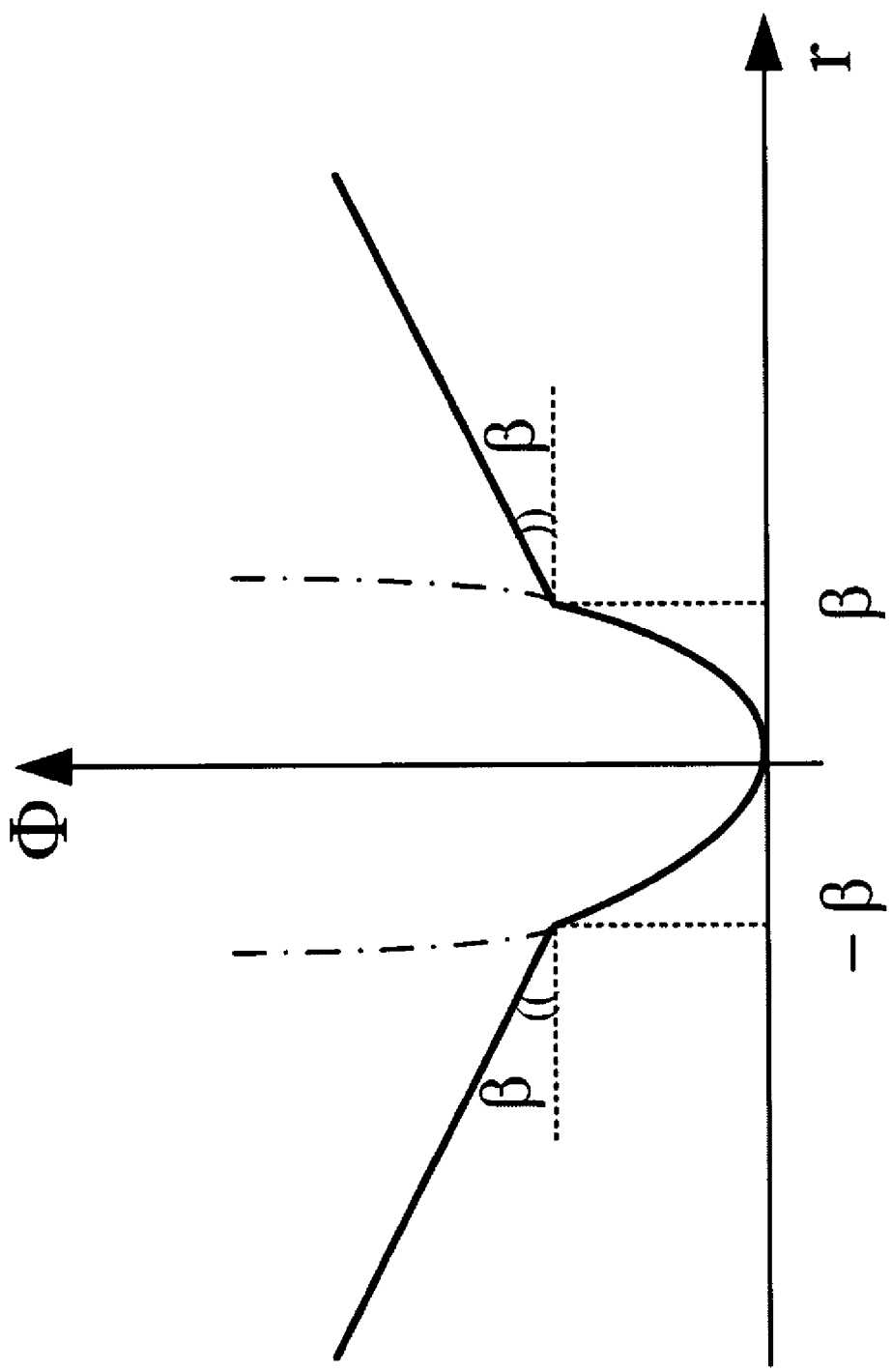
Fig. 1 – Huber Function

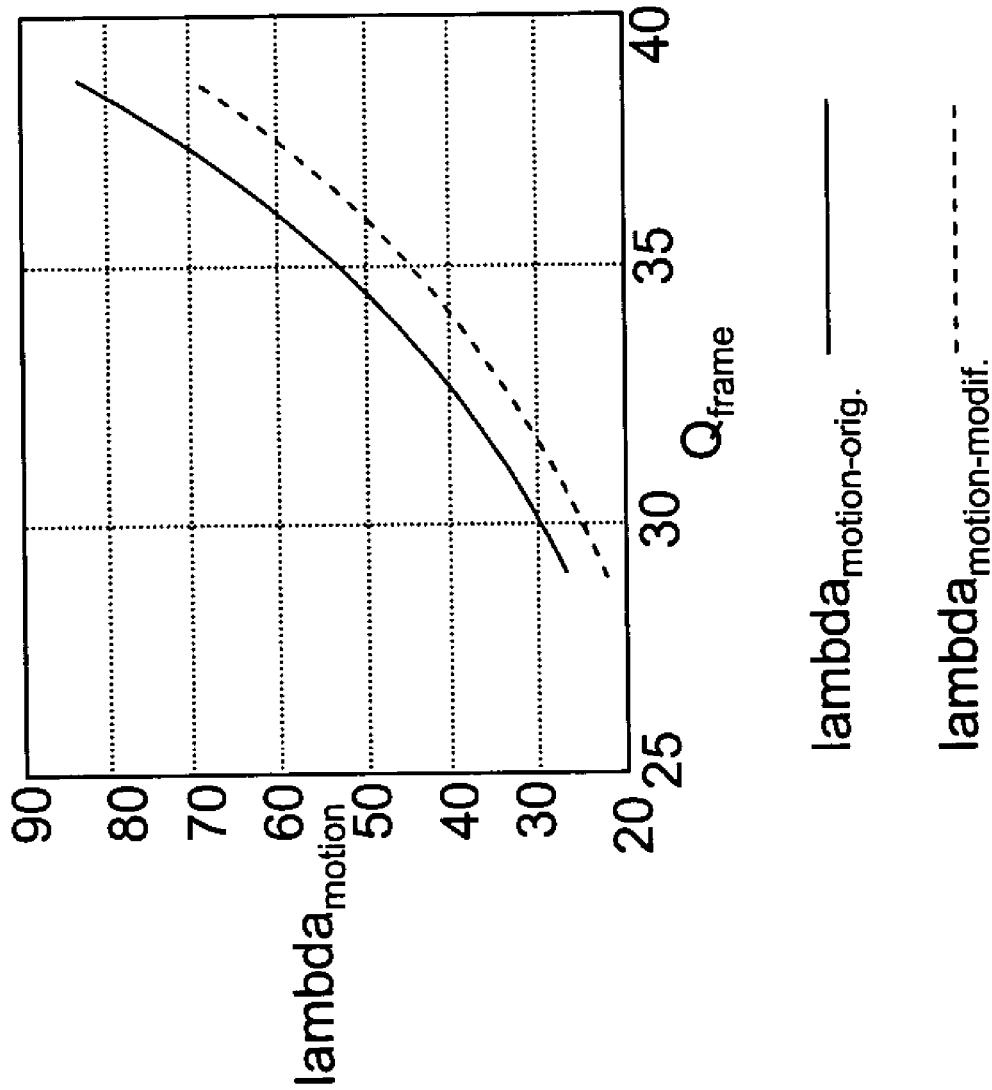

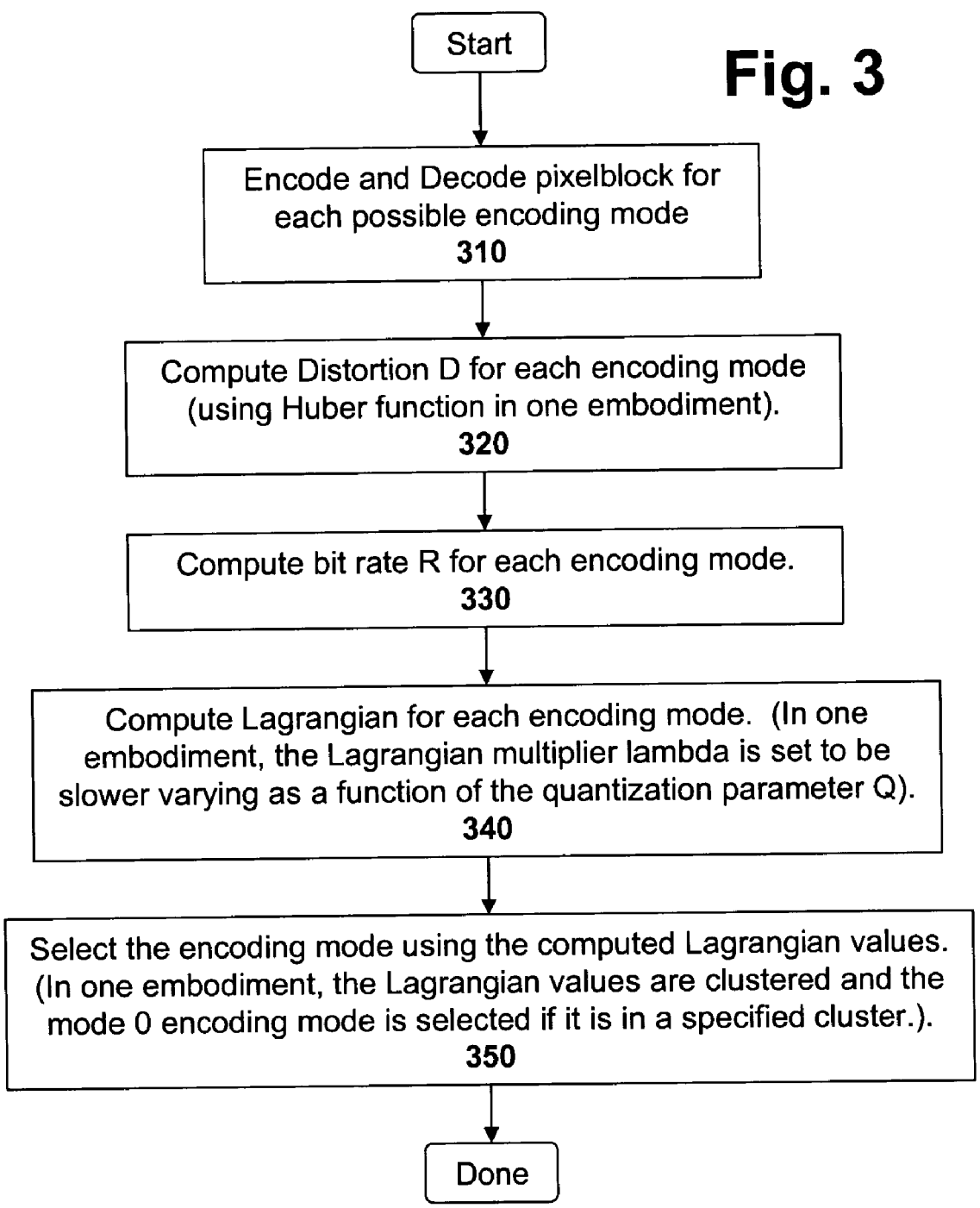

METHOD AND APPARATUS FOR IMPROVED CODING MODE SELECTION

RELATED APPLICATIONS

The present patent application claims the benefit of the previous U.S. Provisional Patent Application entitled "Method and Apparatus for Improved Coding Mode Selection" having Ser. No. 60/439,062 that was filed on Jan. 8, 2003.

FIELD OF THE INVENTION

The present invention relates to the field of multi-media compression systems. In particular, the present invention discloses methods and systems for improving the encoding mode selection.

BACKGROUND OF THE INVENTION

Digital based electronic media formats are finally on the cusp of largely replacing analog electronic media formats. Digital compact discs (CDs) replaced analog vinyl records long ago. Analog magnetic cassette tapes are becoming increasingly rare. Second and third generation digital audio systems such as Mini-discs and MP3 (MPEG Audio—layer 3) are now taking market share from the first generation digital audio format of compact discs.

The video media has been slower to move to digital storage and transmission formats than audio. This has been largely due to the massive amounts of digital information required to accurately represent video in digital form. The massive amounts of digital information needed to accurately represent video require very high-capacity digital storage systems and high-bandwidth transmission systems.

However, video is now rapidly moving to digital storage and transmission formats. Faster computer processors, high-density storage systems, and new efficient compression and encoding algorithms have finally made digital video practical at consumer price points. The DVD (Digital Versatile Disc), a digital video system, has been one of the fastest selling consumer electronic products in years. DVDs have been rapidly supplanting Video-Cassette Recorders (VCRs) as the pre-recorded video playback system of choice due their high video quality, very high audio quality, convenience, and extra features. The antiquated analog NTSC (National Television Standards Committee) video transmission system is now being replaced with the digital ATSC (Advanced Television Standards Committee) video transmission system.

Computer systems have been using various different digital video encoding formats for a number of years. Among the best digital video compression and encoding systems used by computer systems have been the digital video systems backed by the Motion Pictures Expert Group commonly known by the acronym MPEG. The three most well known and highly used digital video formats from MPEG are known simply as MPEG-1, MPEG-2, and MPEG-4. Video CDs and consumer-grade digital video editing systems use the early MPEG-1 format. Digital Versatile Discs (DVDs) and the Dish Network brand Direct Broadcast Satellite (DBS) television broadcast system use the MPEG-2 digital video compression and encoding system. The MPEG-4 encoding system is rapidly being adapted by the latest computer based digital video encoders and associated digital video players.

SUMMARY OF THE INVENTION

Methods and systems for improving the encoding mode selection are Disclosed. In this disclosure, a novel method for direct mode enhancement in B-pictures and skip mode enhancement in P-pictures in the framework of H.264 (MPEG-4/Part 10) is disclosed.

Direct mode and skip mode enhancements are achieved by making a number of changes to the existing compression systems. Specifically, the system of the present invention introduces the steps of removing outliers in the distortion values, specifying smaller values for the Lagrangian multiplier in the rate-distortion optimization for encoding mode selection, and clustering the values of the Lagrangian before encoding mode selection. In one embodiment, the Huber cost function is used to compute the distortion for the different encoding modes in order to remove outliers. In one embodiment of the present invention, the system changes the Lagrangian multiplier to vary slower as a function of the Quantizer value Q than the reference H.264 (MPEG-4/Part 10) implementation. The Lagrangian clustering is used to favor mode 0 encoding mode for bit rate reduction.

Experimental results using high quality video sequences show that bit rate reduction is obtained using the method of the present invention, at the expense of a slight loss in peak signal-to-noise ratio (PSNR). By conducting two different experiments, it has been verified that no subjective visual loss is visible despite the peak signal-to-noise ratio change.

In relationship to the existing rate-distortion optimization methods currently employed in the (non-normative) MPEG-4/Part 10 encoder, the method of the present invention represents a simple and useful add-on. More importantly, when other solutions such as further increasing the values of the quantization parameter are not applicable, as inadmissible artifacts would be introduced in the decoded pictures, the method of the present invention achieves bit rate reduction without introducing visible distortion in the decoded sequences.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIG. 1 graphically illustrates the Huber cost function of a variable r.

FIG. 2C illustrates a variation of original and modified Lagrangian multiplier $\lambda_{motion}$ as a function of the quantization parameter (Q) values in the range of interest.

FIG. 3 illustrates a flow diagram that sets forth how an encoding mode may be selected.

DETAILED DESCRIPTION OF THE PREFERRED EMBODIMENT

Figure 2A:
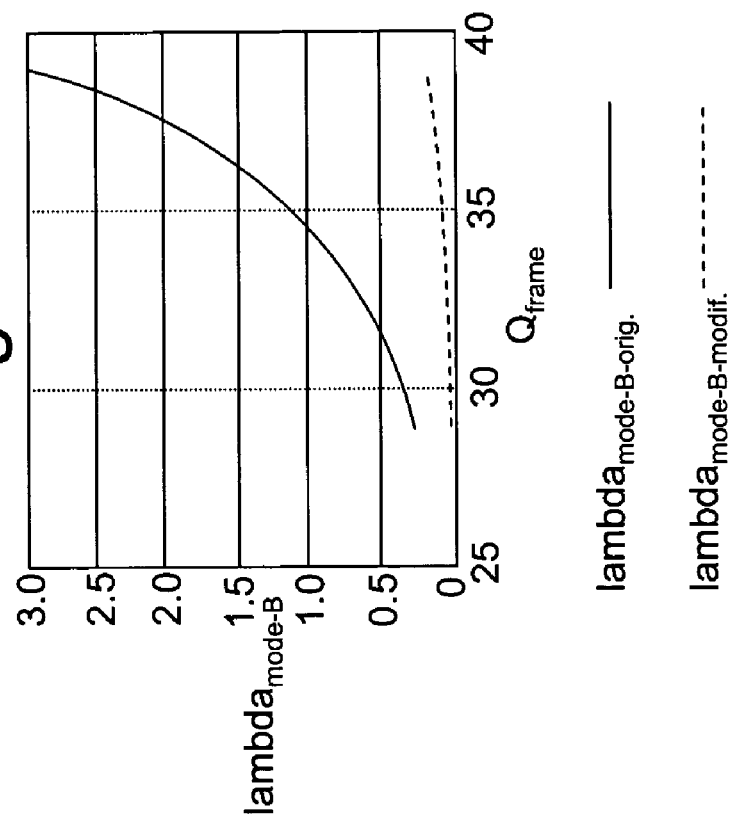
FIG. 2A illustrates a variation of original and modified Lagrangian multiplier $\lambda_{mode}$ as a function of the quantization parameter (Q) values in the range of interest.

A method and system for improving the encoding mode selection is disclosed. In the following description, for purposes of explanation, specific nomenclature is set forth to provide a thorough understanding of the present invention. However, it will be apparent to one skilled in the art that these specific details are not required in order to practice the present invention.

Introduction

The emerging H.264 video encoding standard, also known as MPEG-4/Part 10, Joint Video Team (JVT), Advanced Video Coding (AVC), and H.26L, has been developed jointly by the Motion Picture Experts Group (MPEG) and the International Telecommunication Union (ITU) with the goal to provide higher compression of moving pictures than state-of-art video encoding systems that are compliant with existing MPEG standards. Target applications of H.264, which is expected to become an international standard in 2003, include (but are not limited to) video conferencing, digital storage media, television broadcasting, internet streaming and communication.

Similar to other video encoding standards (in their main body or annexes), the H.264 standard employs a rate-distortion (RD) decision framework. In particular, the H.264 standard employs rate-distortion optimization for encoding mode selection and motion estimation. In this disclosure, the primary focus is on encoding mode selection within the framework of the H.264 standard.

In most digital video encoding systems, each video frame of a video sequence is divided into subsets of pixels, where the subsets of pixels are called pixelblocks. In the H.264 standard, the pixelblocks may have various sizes (The pixelblock with a size equal to 16×16 pixels is traditionally known as a macroblock.). The encoding mode selection problem may be informally defined as "select the best of all possible encoding methods (or encoding modes) to encode each pixelblock in the video frame." The encoding mode selection problem may be solved by the video encoder in a number of different manners. One possible method of solving the encoding mode selection problem is to employ rate-distortion optimization.

There are numerous different encoding modes that may be selected to encode each pixelblock within the framework of the H.264 video encoding standard. Mode 0 is known as 'direct mode' in B-frames and as 'skip mode' in P-frames. Other encoding modes employ pixelblocks of sizes equal to 16×16, 16×8 and 8×16 pixels, 8×8, 8×4, 4×8, 4×4 pixels in B-pictures or P-pictures.

In direct mode (mode 0 in B-pictures), no motion information is transmitted to the decoder. Instead, a predictive system is used to generate motion information. Therefore, the direct mode can provide important bit rate savings for sequences that allow good motion vector predictions using neighboring spatial or temporal information. However, the experimental evaluations have shown that the direct mode selection in H.264 does not yield as many selected pixel-blocks as expected for some video sequences.

This disclosure proposes a method for enhancing the direct mode (mode 0) selection in Bidirectional predicted pictures (known as B-pictures or B-frames) within the framework of the H.264 standard. When applied to P-frames, the encoding method of the present invention achieves enhancement of the skip mode (also mode 0) selection. Direct mode and skip mode enhancements are achieved by clustering the Lagrangian values, removing outliers and specifying smaller values of the Lagrangian multiplier in the rate-distortion optimization for the encoding mode selection.

Experimental results using high quality sample video sequences illustrate that the bit rate of the compressed bitstreams from the present invention are reduced as compared to compressed bitstreams obtained using the reference H.264 codec. This bit rate reduction is associated with a slight loss in the peak signal-to-noise ratio (PSNR) of the bitstream. However, two test experiments verify that no subjective visual loss is associated with the change in the peak signal-to-noise ratio. More importantly, when other possible solutions such as further increasing the values of the quantization parameter are not applicable since unacceptable artifacts would be introduced in the decoded pictures the method of the present invention significantly achieves further bit rate reduction without introducing visible distortion in the decoded video sequences. Furthermore, despite the fact that the present invention makes use of the H.264 framework, the encoding method of the present invention is applicable in any video encoding system that employs rate-distortion optimization.

The remainder of this document is organized as follows. A video compression overview section first presents basic ideas related to the rate-distortion optimization framework within the H.264 standard. The encoding method proposed by the present invention is then set forth in detail in the proposed direct mode enhancement method section. Finally, a set of experimental results and conclusions are provided in the experimental results section and the conclusions section, respectively.

Video Compression Overview

As set forth earlier in this document, each video frame is divided into sets of pixelblocks in the H.264 standard. These pixelblocks may be encoded using motion compensated predictive encoding. A predicted pixelblock may be an Intra (I) pixelblock (an I-pixelblock) that uses no information from preceding pictures in its encoding, a unidirectionally Predicted (P) pixelblock (a P-pixelblock) that uses information from one preceding picture, or Bidirectionally Predicted (B) pixelblock (a B-pixelblock) that uses information from one preceding picture and one future picture.

For each P-pixelblock in a P-picture, one motion vector is computed. (Note that, within each video picture the pixel-blocks may be encoded in many ways. For example, a pixelblock may be divided into smaller sub blocks, with motion vectors computed and transmitted for each subblock. The shape of the subblocks may vary and not be square.) Using the computer motion vector, a prediction pixelblock can be formed by a translation of pixels in the aforementioned previous picture. The difference between the actual pixelblock in the video picture and the prediction pixelblock is then encoded for transmission. (The difference is used to correct minor differences between the predicted pixelblock and the actual pixelblock.)

Each motion vector may also be transmitted via predictive encoding. That is, a prediction for a motion vector is formed using nearby motion vectors that have already been transmitted, and then the difference between the actual motion vector and the predicted motion vector is encoded for transmission.

For each B-pixelblock, two motion vectors are typically computed, one motion vector for the aforementioned previous picture and one motion vector the future picture. (Note that within a P-picture or B-picture, some pixelblocks may be better encoded without using motion compensation. Such pixels may be encoded as Intra-pixelblocks. Within a B-picture, some pixelblocks may be better encoded using forward or backward unidirectional motion compensation. Such pixels may be encoded as forward predicted or backward predicted depending on whether a previous picture or a future picture is used in the prediction.) From the two B-pixelblock motion vectors, two prediction pixelblocks are computed. The two prediction pixelblocks are then combined together to form a final prediction pixelblock. As above, the difference between the actual pixelblock in the video picture and the prediction block is then encoded for transmission.

As with P-pixelblocks, each motion vector of a B-pixelblock may be transmitted via predictive encoding. That is, a prediction motion vector may be formed using nearby motion vectors that have already been transmitted. Then the difference between the actual motion vector and the prediction motion vector is then encoded for transmission.

However, with B-pixelblocks the opportunity also exists for interpolating the motion vectors from those in the collocated or nearby pixelblocks of the stored pictures. (When the motion vector prediction is constructed using motion vectors of the collocated blocks of the current pixelblock, the direct mode type is known as the temporal direct mode. When the motion vector prediction is constructed using spatial neighbors of the current pixelblock, the direct mode type is known as the spatial direct mode.) The interpolated value may then be used as a prediction motion vector and the difference between the actual motion vector and the prediction motion vector encoded for transmission. Such interpolation is carried out both in the encoder and decoder. (Note that an encoder always has a decoder so the encoder will know exactly how a reconstructed video picture will appear.)

In some cases, the interpolated motion vector is good enough to be used without any correction difference, in which case no motion vector data needs be transmitted at all. This is referred to as Direct Mode in the H.264 (and H.263) standard. Direct mode selection is particularly effective when recording camera is slowly panning across a stationary background. In fact, the motion vector interpolation may be good enough to be used as is, which means that no differential information need be transmitted for these B-pixelblock motion vectors. In skip mode (mode 0 in P-pictures), the motion vector prediction is constructed identically as in the 16×16 direct mode such that no transmission of motion vector bits is carried out.

Prior to transmission, the prediction error (the difference) of a pixelblock or subblock is typically transformed, quantized and entropy encoded to reduce the number of bits. The prediction error, which is computed as the mean square error between the original desired pixelblock and the decoded prediction pixelblock after encoding using direct mode, is encoded in direct mode. However, the prediction error is not encoded and transmitted in skip mode. The subblock size and shape used for the transform may not be the same as the subblock size and shape used for motion compensation. For example, 8×8 pixels or 4×4 pixels are commonly used for transforms, whereas 16×16 pixels, 16×8 pixels, 8×16 pixels or smaller sizes are commonly used for motion compensation. The motion compensation and transform subblock sizes and shapes may vary from pixelblock to pixelblock.

The selection of the best encoding mode to encode each pixelblock is one of the decisions in the H.264 standard that has a very direct impact on the bit rate R of the compressed bitstream, as well as on the distortion D in the decoded video sequence. The goal of encoding mode selection is to select the encoding mode M* that minimizes the distortion $D(\bar{p})$ subject to a bit rate constraint of $R(\bar{p}) \leq R_{max}$, where $\bar{p}$ is the vector of adjustable encoding parameters and $R_{max}$ is the maximum allowed bit rate. This constrained optimization problem may be transformed into an unconstrained optimization problem using the Lagrangian equation $J(\bar{p},\lambda)$ given by:

$$J(\bar{p},\lambda)=D(\bar{p})+\lambda R(\bar{p}) \qquad (1)$$

where $\lambda$ is the Lagrangian multiplier which controls the rate-distortion tradeoff. The encoding mode decision problem becomes the minimization of $J(\bar{p},\lambda)$. This may be expressed in the following equation:

$$\min_{all\ \bar{p}}\{D(\bar{p}) + \lambda R(\bar{p})\} \qquad (2)$$

The preceding Lagrangian equation may be evaluated by performing the following steps for each admissible encoding mode:

(a) Compute the distortion D as the $L_2$ norm of the error between the original pixelblock and the reconstructed pixelblock after encoding and decoding using a specific encoding mode;

(b) Compute the bit rate R as the total number of bits that are necessary to encode the motion vectors and the transform coefficients;

(c) Compute the Lagrangian J using equation (1);

Finally, the minimum Lagrangian J obtained after computing the Lagrangian J values for all encoding modes indicates the encoding mode M* that solves the minimization expressed by equation (2).

Note that, in the H.264 video compression standard, the encoding mode decision is performed using 8×8 and smaller pixelblocks prior to the encoding mode decision for the larger pixelblocks. Furthermore, note that in an effort to reduce the complexity of the optimization process, the minimization determination is carried out with a fixed Quantizer value Q, and the Lagrange multiplier is often selected to be equal to (for instance) $0.85 \times Q/2$ or $0.85 \times 2^{Q/3}$, where Q is the quantization parameter. For multiple B-pictures, much larger values are often chosen. Of course, this complexity reduction also restricts the search for the minimum value of the Lagrangian J in the rate-distortion plane.

Proposed Direct Mode Enhancement Method

The system of the present invention proposes a method for enhancement of direct mode selection in B-frames and skip mode selection in P-frames. The system of the present invention employs a clustering of cost values, outlier reduction, and specification of the Lagrange multiplier. In one embodiment, the system performs the method using four steps. The following text provides a detailed recitation of these method steps with reference to FIG. 3.

First, the current pixelblock is both encoded and decoded for each possible encoding mode M and the distortion $D_M$ is computed as set forth in steps 310 and 320. In one embodiment, the distortion $D_M$ is computed as the sum of the Huber function values of the errors between the pixels in the original pixelblock and the pixels in the decoded pixelblock. The Huber function, which is illustrated in FIG. 1, is given by the following equation:

$$D_M(x) = \begin{cases} \frac{1}{2}x^2, & |x| \leq \beta \\ \beta|x| - \frac{1}{2}\beta^2, & |x| > \beta \end{cases}$$

where x is the error for one pixel of the pixelblock and β is a parameter. Clearly, for error values that are smaller than β, the value of the Huber function is equal to that given by the square error. For error values that are larger than β, the value of the Huber function is smaller than that of the square error for the same error value.

Second, the bit rate R for each encoding mode is computed as set forth in step 330. In one embodiment, the system computes the bit rate R as the total number of bits that are necessary to encode the motion vectors and transform coefficients of the pixelblock.

Figure 2B:
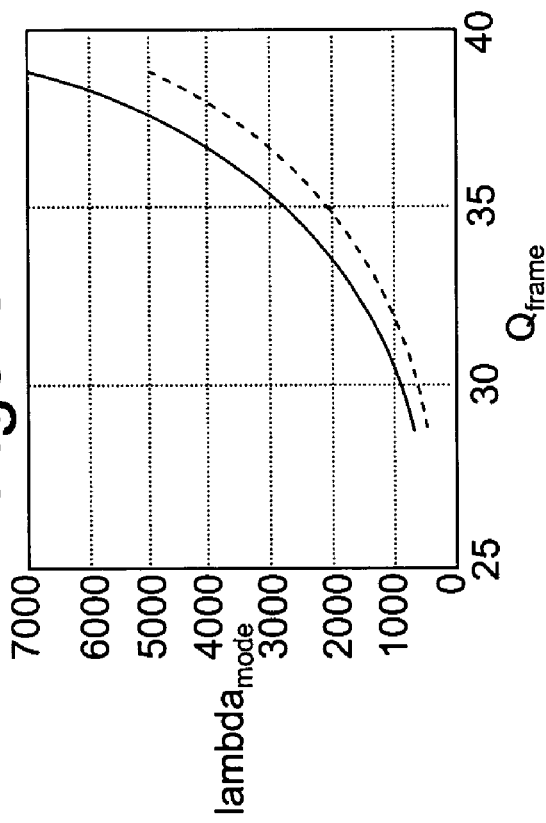
FIG. 2B illustrates a variation of original and modified Lagrangian multiplier $\lambda_{mode}$ for B-frames as a function of the quantization parameter (Q) values in the range of interest.

Third, the system of the present invention computes the Lagrangian for the encoding mode using equation (1) as set forth in step 340. In one embodiment, the system selects the value of the Lagrangian multiplier λ to be slower varying as a function of the quantization parameter than the original Lagrangian λ proposed in the non-normative part of the H.264 standard version 4.1. The proposed variation of Lagrangian λ as a function of the Quantizer Q is illustrated in FIGS. 2A, 2B, and 2C. By making the Lagrangian multiplier lambda vary slower than the lambda in the reference implementation, the system of the present invention places less emphasis on the bit rate component R of the Lagrangian equation (1) and thus more emphasis on the distortion component D. As a result of this change to the Lagrangian multiplier lambda, slight increases in the bit rate R will have less effect on the output Lagrangian value of J. (This will also reduce the effect of bit rate R has on the Lagrangian cluster set forth in the following paragraph.)

Fourth, let $J_{M^*}$ be the minimum value of J for all $J_M$ (using equation (1)), where M is one of the possible encoding modes. Instead of selecting the encoding mode (M*) as that which yields $J_{M^*}$, the system clusters the values of the computed Lagrangians $J_M$ as follows. Let S be the set of encoding modes k for which the computed Lagrangian values satisfy the condition:

$$S = \left\{ k \,\middle|\, \frac{J^*}{J_k} \geq \varepsilon \right\} \quad (3)$$

Where epsilon ('∈') is a selected error value and J* is the minimum J for all modes. If encoding mode 0 is a member of the set S, then the system selects encoding mode 0 as the encoding mode that will be used to encode the pixelblock, otherwise the system selects the encoding mode M* that corresponds to $J_{M^*}$ (the encoding mode M* that yields the smallest J value).

The above steps make use of novel components as compared to the reference (non-normative) H.264 encoder. Specifically, the present invention makes use of the Huber cost function to compute distortion, modified Lagrangian multipliers, and clustering of the Lagrangian values.

The Huber cost function belongs to the class of robust M-estimators. An important property of these functions is their ability to reduce the impact of the outliers. More specifically, if any outliers exist within a pixelblock, the Huber cost function weights them less (linearly) than the mean square error function would (quadratically), in turn allowing the encoding mode selected for that pixelblock to be perhaps identical to that of the neighboring macroblocks.

The modified Lagrangian multiplier λ varies slower as a function of the quantization parameter Q and therefore places more emphasis on the distortion component of the Lagrangian J than on the bit rate component R. (In this document, 'lambda' or the lambda symbol 'λ' denotes the Lagrangian multiplier that is used in the encoding mode decision process. The multiplier that is used in the motion vector selection process is different.)

Finally, the clustering of the Lagrangian values described earlier favors encoding mode 0. Consequently, the system of the present invention allows more pixelblocks to be encoded using direct mode or skip mode for B-pixelblocks and P-pixelblocks, respectively.

Experimental Results

The video test set employed in the experiments consists of nine color video clips from movie sequences "Discovering Egypt", "Gone with the Wind", and "The English Patient". The specific characteristics of these video sequences are set forth in Table 1.

TABLE 1

Test sequences.

| Seq. No. | Video sequence name | Frame size | No. frames | Type |
|---|---|---|---|---|
| 1 | Discovering Egypt, ch. 1 | 704 × 464 | 58 | Pan |
| 2 | Gone with the Wind, ch. 11 | 720 × 480 | 44 | Og |
| 3 | Discovering Egypt, ch. 1 | 704 × 464 | 630 | Pan |
| 4 | Discovering Egypt, ch. 2 | 704 × 464 | 148 | Zoom |
| 5 | Discovering Egypt, ch. 3 | 704 × 464 | 196 | Boom |
| 6 | Discovering Egypt, ch. 6 | 704 × 464 | 298 | Pan |
| 7 | The English Patient, ch. 2 | 720 × 352 | 97 | Texture |
| 8 | The English Patient, ch. 6 | 720 × 352 | 196 | Og |
| 9 | The English Patient, ch. 8 | 720 × 352 | 151 | Og |

(The abbreviations ch and Og stand for chapter and opposing glances, respectively.)

The video frames are represented in YUV format and the video frame rate is equal to 23.976 frames per second (fps) for all of the video sequences. The effectiveness of the method proposed by the present invention has been evaluated using the bit rate R of the compressed video sequences and the visual quality of the decoded video sequences. The latter is evaluated by visual inspection of the video sequences and the peak signal-to-noise ratio (PSNR) values.

The novel components in the encoding method of the present invention described in the Proposed Direct Mode Enhancement Method section complement each other in terms of their impact on the rate and distortion. The method of the present invention yields an overall bit rate reduction as well as a slight peak signal-to-noise reduction. The system of the present invention has been evaluated using two experiments that are described in the following section of text.

Fixed Quantization Parameter for All Sequences

The first experiment selects the quantization parameter Q to be the same for all of the video sequences and to be equal to Q, Q+1, Q+3 for the I-frames, P-frames, and B-frames, respectively. As set forth in Table 2, the bit rate reduction may be as high as 9% when using the encoding method of the present invention, where as the loss in peak signal-tonoise ratio (PSNR) is around 0.12 dB. No distortion is visible in the video sequences encoded using the encoding method of the present invention as compared to those encoded using the reference method.

TABLE 2

Bit rate (BR) [kbits/sec] and peak signal-to-noise ratio (PSNR) [dB] for movie sequences using the reference method and the proposed method using the same quantization parameter Q for all of the sequences.

| Seq. No. | Reference Method | | Proposed Method | |
|---|---|---|---|---|
| | Bit rate [kbits/sec] | PSNR [dB] | Bit rate [kbits/sec] | PSNR [dB] |
| 1 | 162.04 | 38.89 | 155.43 (−4.08%) | 38.75 (−0.13 dB) |
| 2 | 287.71 | 39.82 | 283.35 (−1.51%) | 39.71 (−0.11 dB) |
| 3 | 659.14 | 37.32 | 650.92 (−1.24%) | 37.20 (−0.12 dB) |
| 4 | 1029.02 | 35.84 | 1012.17 (−1.63%) | 35.76 (−0.07 dB) |
| 5 | 390.46 | 36.77 | 354.25 (−9.27%) | 35.59 (−0.18 dB) |
| 6 | 144.82 | 39.11 | 139.02 (−4.00%) | 39.02 (−0.09 dB) |
| 7 | 257.06 | 37.30 | 255.08 (−0.76%) | 37.12 (−0.18 dB) |
| 8 | 102.75 | 40.17 | 99.81 (−2.85%) | 40.03 (−0.13 dB) |
| 9 | 222.29 | 39.62 | 218.48 (−1.71%) | 39.50 (−0.12 dB |
| Max BR Change: | | | −9.27% | |
| Min BR Change: | | | −0.76% | |
| Avg. BR Change: | | | −3.00% | |
| Max PSNR Gain: | | | | 0 dB |
| Max PSNR Loss: | | | | −0.183 dB |
| Avg. PSNR Change: | | | | −0.128 dB |

The Highest Quantization Parameter for Each Sequence

To further evaluate the usefulness of the encoding method of the present invention, a second experiment was designed and conducted. A general argument when both the bit rate R and the peak signal-to-noise ratio values decrease is that, many methods, such as pre-filtering of video sequences, increasing the values of the quantizer Q, etc., can yield similar results. The goal in this experiment is to show that, when these solutions cannot be applied further without impairing the video quality unacceptably, the method of the present invention can further reduce the bit rate.

First, for each test video sequence, the bit rate is reduced as much as possible using the reference method by increasing the values of the quantization parameter until $Q_{max}+1$ when distortion becomes visible. Next, the system encodes and decodes the video sequence using $Q_{max}$ (maximum value for which distortion is not yet visible) and the reference method, yielding the bit rates and peak signal-to-noise ratio (PSNR) values included in Table 3. For each sequence, the value of $Q_{max}$ is different and it is also different for the I-frames, P-frames, and B-frames, respectively. Given this maximum achievable bit rate reduction at no visual loss, the encoding method of the present invention is then applied for encoding the sequences at the same value $Q_{max}$.

TABLE 3

Bit rate (BR) [kbits/sec] and peak signal-to-noise ratio (PSNR) [dB] for movie sequences using the reference method and the proposed method using the highest quantization parameters.

| Seq. No. | Reference Method | | Proposed Method | |
|---|---|---|---|---|
| | Bit rate [kbits/sec] | PSNR [dB] | Bit rate [kbits/sec] | PSNR [dB] |
| 1 | 512.59 | 41.39 | 479.52 (−6.45%) | 41.15 (−0.24 dB) |
| 2 | 316.70 | 40.10 | 298.86 (−5.63%) | 39.89 (−0.21 dB) |
| 5 | 238.78 | 35.74 | 210.40 (−11.33%) | 35.18 (−0.56 dB) |

TABLE 3-continued

Bit rate (BR) [kbits/sec] and peak signal-to-noise ratio (PSNR) [dB] for movie sequences using the reference method and the proposed method using the highest quantization parameters.

| Seq. No. | Reference Method | | Proposed Method | |
|---|---|---|---|---|
| | Bit rate [kbits/sec] | PSNR [dB] | Bit rate [kbits/sec] | PSNR [dB] |
| 6 | 169.28 | 39.46 | 146.75 (−13.30%) | 39.10 (−0.36 dB) |
| 7 | 300.56 | 37.78 | 290.67 (−3.28%) | 37.50 (−0.28 dB) |
| 9 | 276.91 | 40.45 | 270.56 (−2.30%) | 40.31 (−0.14 dB) |
| Max BR Change: | | −13.30% | | |
| Min BR Change: | | −2.30% | | |
| Avg. BR Change: | | −7.04% | | |
| Max PSNR Gain: | | | | 0 dB |
| Max PSNR Loss: | | | | −0.56 dB |
| Avg. PSNR Change: | | | | −0.29 dB |

As set forth in Table 3, the method of the present invention is further able to reduce the bit rate significantly by up to 13.3% for peak signal-to-noise ratio (PSNR) loss around 0.29 dB. By visual inspection of the sequences at full frame rate (in order to evaluate any B-frame related artifacts), one can determine that this bit rate reduction does not introduce visible artifacts in the decoded video sequences. Note that, one may increase the value of the quantization parameter above $Q_{max}$ when using the method of the present invention and obtain more bit rate reduction without visual loss.

CONCLUSIONS

The present invention has proposed a method for direct mode enhancement in B-pictures and skip mode enhancement in P-pictures in the framework of the H.264 (MPEG-4/Part 10) video compression standard. The system of the present invention makes use of a Huber cost function to compute distortion, modified Lagrangian multipliers, and clustering of the Lagrangian values to select the encoding mode that will be used to encode a pixelblock. Tests have shown that significant bit rate reduction is obtained using the method of the present invention at a slight loss in peak signal-to-noise ratio (PSNR) yet with no subjective visual quality degradation. These features make the method of the present invention particularly useful for bit rate reduction in any video encoding system that employs a rate-distortion optimization framework for encoding mode decision, as an add-on when other solutions such as further increasing the values of the quantization parameter are not applicable more.

The foregoing has described a method and apparatus for performing digital image enhancement. It is contemplated that changes and modifications may be made by one of ordinary skill in the art, to the materials and arrangements of elements of the present invention without departing from the scope of the invention.

We claim:

1. A method of performing mode selection in a video compression and encoding system, said method comprising:
   encoding with a plurality of encoding modes from a set of encoding modes;
   computing a distortion value for each encoding mode from the plurality of encoding modes;
   computing a bit rate value for each encoding mode from the plurality of encoding modes;

computing a Lagrangian value for each encoding mode from the plurality of encoding modes using said distortion value, said bit rate value, and a Lagrangian multiplier;

clustering said Lagrangian values; and selecting an encoding mode based on said Lagrangian values by selecting a mode 0 encoding method if said mode 0 encoding method is in a specific cluster.

2. The method as claimed in claim 1, wherein computing said distortion value comprises using a function that reduces the effects of outliers.

3. The method as claimed in claim 1, wherein computing said distortion value comprises using a Huber function.

4. The method as claimed in claim 1, wherein computing said bit rate value comprises a total number of bits that are necessary to encode a set of motion vectors and a set of transform coefficients.

5. The method as claimed in claim 1, wherein said Lagrangian multiplier comprises a slow varying Lagrangian multiplier as a function of a quantization value.

6. The method as claimed in claim 1, wherein said specific cluster includes an encoding mode that produces a smallest Lagrangian value.

7. The method as claimed in claim 1, said method further comprising:

selecting an encoding mode that produces a smallest Lagrangian value if said mode 0 encoding method is not in a specific cluster.

\* \* \* \* \*